(12) United States Patent
Turner

(10) Patent No.: US 9,881,322 B2
(45) Date of Patent: Jan. 30, 2018

(54) DATA TRANSFER BETWEEN MOBILE COMPUTING DEVICES USING SHORT-RANGE COMMUNICATION SYSTEMS

(71) Applicant: BCard, Inc., Spokane, WA (US)

(72) Inventor: Brett Turner, Encinitas, CA (US)

(73) Assignee: BCARD, INC., Spokane, WA (US)

( * ) Notice: Subject to any disclaimer, the term of this patent is extended or adjusted under 35 U.S.C. 154(b) by 0 days.

(21) Appl. No.: 15/187,704

(22) Filed: Jun. 20, 2016

(65) Prior Publication Data

US 2016/0371736 A1 Dec. 22, 2016

Related U.S. Application Data

(60) Provisional application No. 62/181,726, filed on Jun. 18, 2015.

(51) Int. Cl.
*H04B 7/00* (2006.01)
*G06Q 30/02* (2012.01)
*H04L 12/58* (2006.01)
*H04W 4/00* (2009.01)

(52) U.S. Cl.
CPC ..... *G06Q 30/0267* (2013.01); *G06Q 30/0269* (2013.01); *H04L 51/10* (2013.01); *H04W 4/008* (2013.01)

(58) Field of Classification Search
CPC ......... H04W 4/008; H04W 4/02; H04W 4/18; H04W 76/02; H04W 12/06; H04W 84/18; H04W 8/005

USPC ...... 455/417, 418, 419, 420, 445, 517, 41.1, 455/41.2, 41.3
See application file for complete search history.

(56) References Cited

U.S. PATENT DOCUMENTS

| | | | |
|---|---|---|---|
| 9,031,583 B2 * | 5/2015 | Pereira | H04W 4/02 455/456.1 |
| 2003/0140046 A1 * | 7/2003 | Thomas | G06F 9/4451 |
| 2007/0245223 A1 * | 10/2007 | Siedzik | G06F 17/30056 715/203 |
| 2011/0145687 A1 * | 6/2011 | Grigsby | G06F 17/30884 715/206 |
| 2012/0297466 A1 * | 11/2012 | Li | G06F 21/10 726/7 |
| 2013/0052954 A1 * | 2/2013 | Avadhanam | H04W 4/008 455/41.2 |

(Continued)

*Primary Examiner* — Jean Gelin
(74) *Attorney, Agent, or Firm* — Mintz Levin Cohn Ferris Glovsky and Popeo, P.C.

(57) ABSTRACT

Transferring data between mobile computing device by converting contact information stored in a proprietary format on the first mobile computing device to a nonproprietary graphical format, transferring the contact information in the nonproprietary graphical format from the first mobile computing device to a second mobile computing device and storing the contact information in the nonproprietary graphical format on the second mobile computing device. The contact information stored in the nonproprietary graphical format on the second mobile computing device can be converted to the proprietary format and stored on the second mobile computing device. The transfer of the contact information can be performed in response to an indication that the users of the first and second mobile computing devices have had contact with one another.

13 Claims, 5 Drawing Sheets

(56) References Cited

U.S. PATENT DOCUMENTS

| | | | |
|---|---|---|---|
| 2013/0091238 A1* | 4/2013 | Liu | H04W 76/02 |
| | | | 709/217 |
| 2013/0128305 A1* | 5/2013 | Grabkowitz | H04N 1/00225 |
| | | | 358/1.15 |
| 2013/0318249 A1* | 11/2013 | McDonough | H04L 67/02 |
| | | | 709/228 |
| 2014/0372555 A1* | 12/2014 | Brunsman | H04L 67/10 |
| | | | 709/217 |
| 2015/0163302 A1* | 6/2015 | Armstrong | H04L 67/06 |
| | | | 709/217 |
| 2016/0202939 A1* | 7/2016 | Lenin | G06F 3/1222 |
| | | | 358/1.14 |

\* cited by examiner

DATA TRANSFER BETWEEN MOBILE COMPUTING DEVICES USING SHORT-RANGE COMMUNICATION SYSTEMS

TECHNICAL FIELD

The subject matter described herein relates to transferring data between mobile computing devices using short-range communication systems.

BACKGROUND

The present method of transferring contact information between mobile computing devices includes sending contact information via one or more electronic messaging methods, such as email, MMS, SMS, and/or other electronic messaging methods. Other methods include transferring contact information between mobile computing devices using one or more wireless data connections. The present method of transferring contact information, and other data, require compatibility between the mobile computing devices in order to facilitate presentation of that contact information and/or data on the recipient mobile computing device.

SUMMARY

In one aspect, the present disclosure describes a method for transferring contact information between mobile computing device. The method can be performed by at least one physical computer processor forming at least part of a computer system. Contact information can be converted, by at least one physical computer processor on a first mobile computing device, from a proprietary format stored on the first mobile computing device to a nonproprietary graphical format. The nonproprietary graphical format can be any format commonly used by mobile computing devices to manage and process graphical data.

The contact information in the nonproprietary graphical format can be transferred from the first mobile computing device to the second mobile computing device. The contact information in the nonproprietary graphical format can be transferred from the first mobile computing device to a second mobile computing device using a short-range wireless communication technology between the first mobile computing device and the second mobile computing device.

The contact information in the nonproprietary graphical format can be stored on the second mobile computing device. The contact information stored in the nonproprietary graphical format facilitates presentation of the contact information on a display of the second mobile computing device.

During conversion a machine-readable identifier, or label, can be inserted into the contact information stored in the nonproprietary graphical format, by the at least one processor of the first mobile computing device. The machine-readable identifier, or label, can be configured to facilitate identifying of the contact information as being associated with a software application that uses the proprietary format. The at least one processor of the second mobile computing device can be configured to identify contact information stored in the nonproprietary graphical format that is associated with the mobile application based on the machine-readable identifier. The machine-readable identifier, or label, can include a watermark embedded in the contact information stored in the nonproprietary graphical format.

At least one physical processor on the second mobile computing device can convert the contact information in the nonproprietary graphical format to the proprietary format. The at least one physical processor on the second mobile computing device can cause the contact information in the proprietary format to be stored on the second mobile computing device.

Updated contact information can be received at a server for the contact information stored in the proprietary format on the first mobile computing device. The updated contact information can be transmitted to the second mobile device. The contact information can be stored in the proprietary format on the second mobile device with the updated contact information.

In some variations, a determination by the at least one physical processor on the first mobile computing device of whether a user of the first mobile computing device is participating in an event can be made. Similarly, a determination can be made as to whether the second user is participating in the event. In response to a determination that the users are participating in the same event, the contact information in the nonproprietary graphical format can be transferred from the first mobile computing device to the second mobile computing device based on a determination that use of the second mobile computing device is participating in the same event as the user of the first mobile computing device.

Participation in the event can be determined based on the proximity of the first mobile computing device to the second mobile computing device. Participation in the event can be determined based on information obtained by the first mobile computing device and the second mobile computing device from one or more of an electronic calendar, a telephone history, and electronic messages.

An indication can be transmitted to the second mobile computing device that the contact information stored in the proprietary format on the first mobile computing device can be downloaded to the second mobile computing device. A request can be received at the first mobile computing device from the second mobile computing device to download the contact information stored in the proprietary format on the first mobile computing device.

In some variations, a contact information management application can be executed by a mobile computing device. Contact information associated with the user of the mobile computing device can be obtained. The contact information can be transmitted to other mobile computing devices.

The current subject matter describes a method performed by at least one physical computer processor forming at least part of a computer system. The method can include capturing, using a camera of a first mobile computing device, an image of a business card associated with a prospective contact. Contact information associated with the prospective contact can be obtained. An invitation can be generated providing an offer to execute a contact information management application. The invitation can be sent to the prospective contact. The contact information management application can be configured to facilitate generation of a virtual business card of the prospective contact.

A virtual business card of the prospective contact can be transmitted to the first mobile computing device. The virtual business card of the prospective contact can be stored in a virtual business card library associated with the first mobile computing device.

The image of the business card of the prospective contact can be stored in the virtual business card library associated with the first mobile computing device. Storing the virtual business card of the prospective contact in the virtual business card library associated with the first mobile computing device can include replacing the image of the business card with the virtual business card.

Another aspect of the currently described subject matter contemplates a computer program product comprising a non-transitory machine-readable medium storing instructions that, when executed by at least one programmable processor, cause the at least one programmable processor to perform one or more of the operations described herein.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the current subject facilitates transfer of proprietary data from one mobile computing device to another mobile computing device and storing that data in a graphical image file format on the recipient mobile computing device. The current subject matter facilitates the provision of an in-person exchange of information between mobile computing devices, such as contact information, in a manner that emulates a physical exchange of information.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
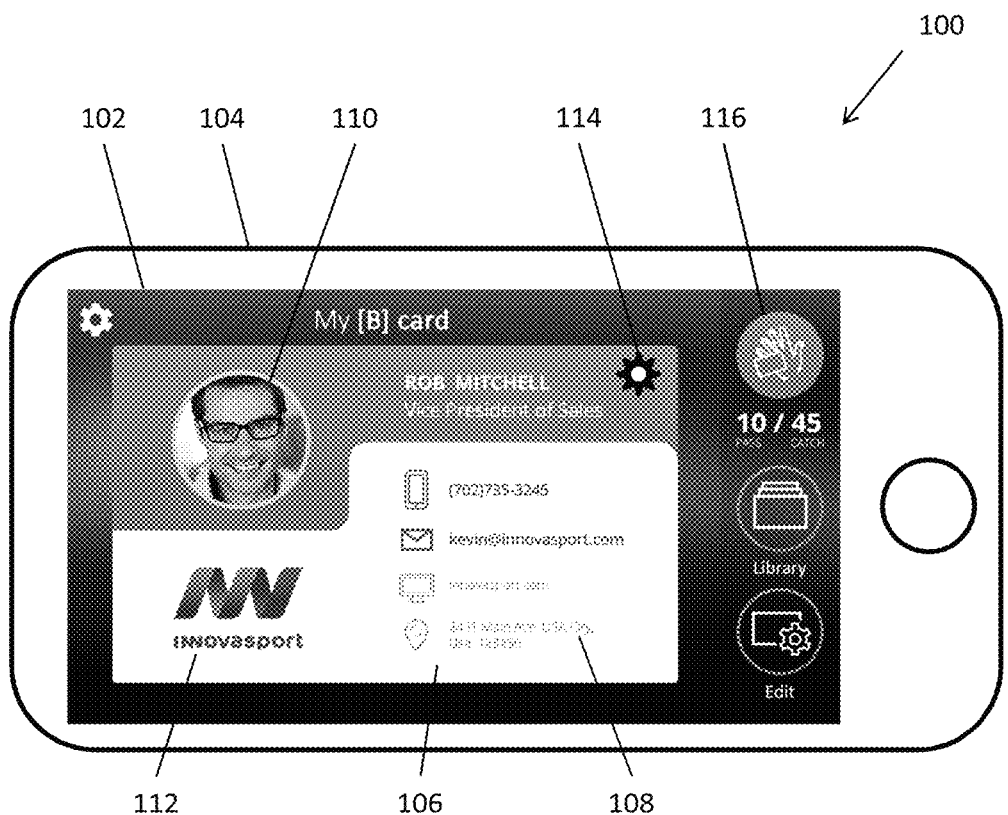
FIG. 1 is a diagram illustrating aspects of data stored in a proprietary format having features consistent with implementations of the current subject matter; and, FIG. 2 is a process flow diagram illustrating aspects of a method having one or more features consistent with implementations of the current subject matter.

Data can be stored on a mobile computing device. Mobile computing devices contemplated by the current subject matter include but are not limited to smartphones, tablets, smart watches, laptop computers, cell phones, PDA, pentop, and/or other mobile computing devices. The data stored on a mobile computing device can be stored in a proprietary format. The current subject matter is illustrated and described with respect to the data being contact information in the form of a virtual business card, however the current subject contemplates any form of data and the methods, systems and software systems herein described are intended to relate to data of any form. FIG. 1 is a diagram 100 illustrating aspects of data stored in a proprietary format having features consistent with implementations of the current subject matter. The data can be stored in a proprietary format associated with an application 102. The application 102 can be configured to operate on a mobile computing device 104. The data can be contact information 106 presented in the form of a virtual business card. The proprietary format of the data can be configured such that information contained in the data can be accessed by the application 102 only. The application 102 can prompt for a key or password to unlock the information contained in the data. The contact information 106 can resemble any form of contact information. The contact information 106 can include personal information 108. The personal information can include telephone numbers, email addresses, title, name and/or other personal information. The contact information 106 can include an image 110. The image 110 can be an avatar representative of the contact. The image 110 can be a photograph of the contact. The contact information 106 can include a company logo 112. The contact information 106 can include a logo 112. The logo 112 can be a company logo 112. The contact information 106 can include a security mark 114. The security mark 114 can indicate that the veracity of one or more elements of the contact information 106.

Figure 2:
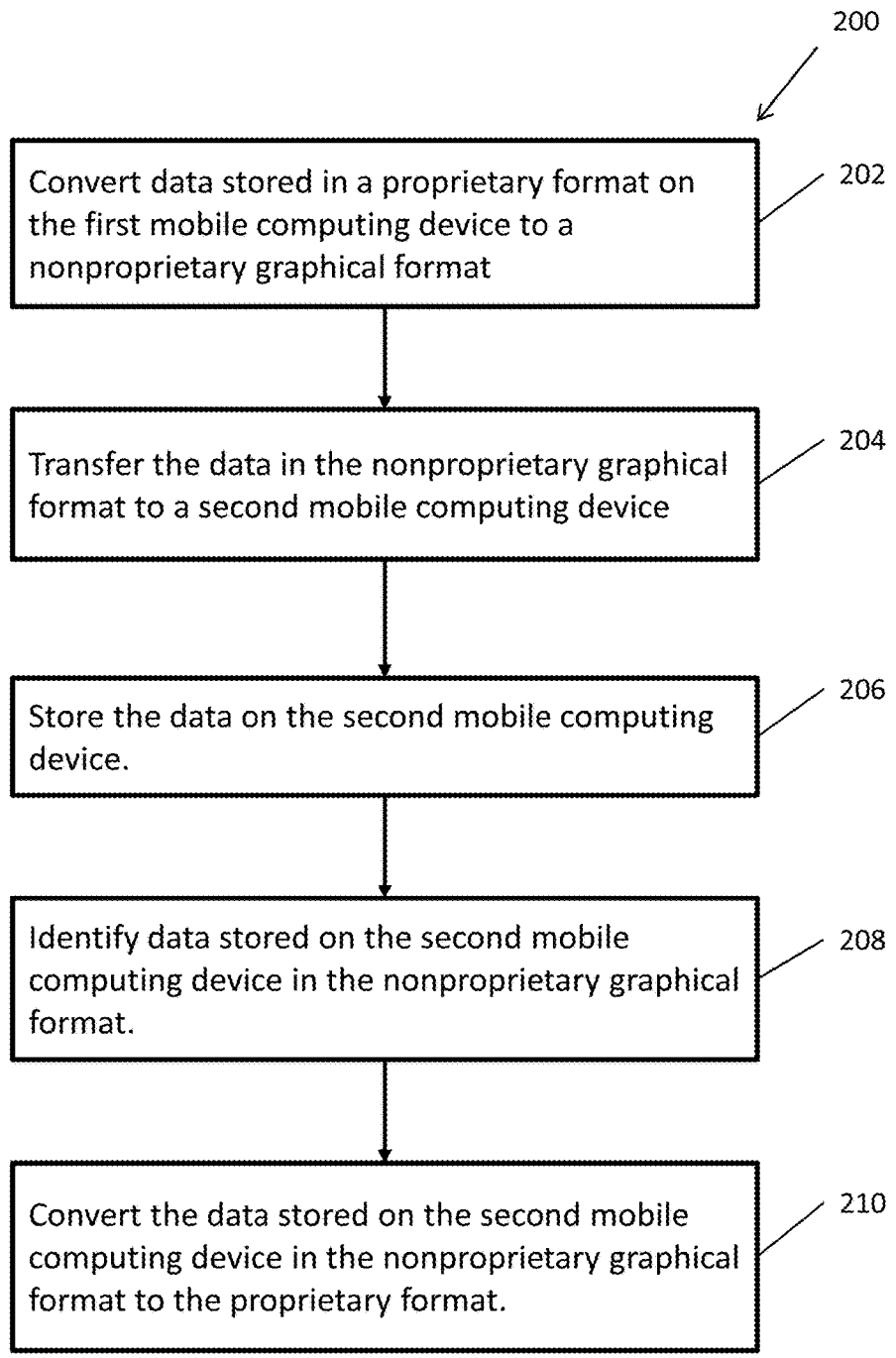
Figure 3:
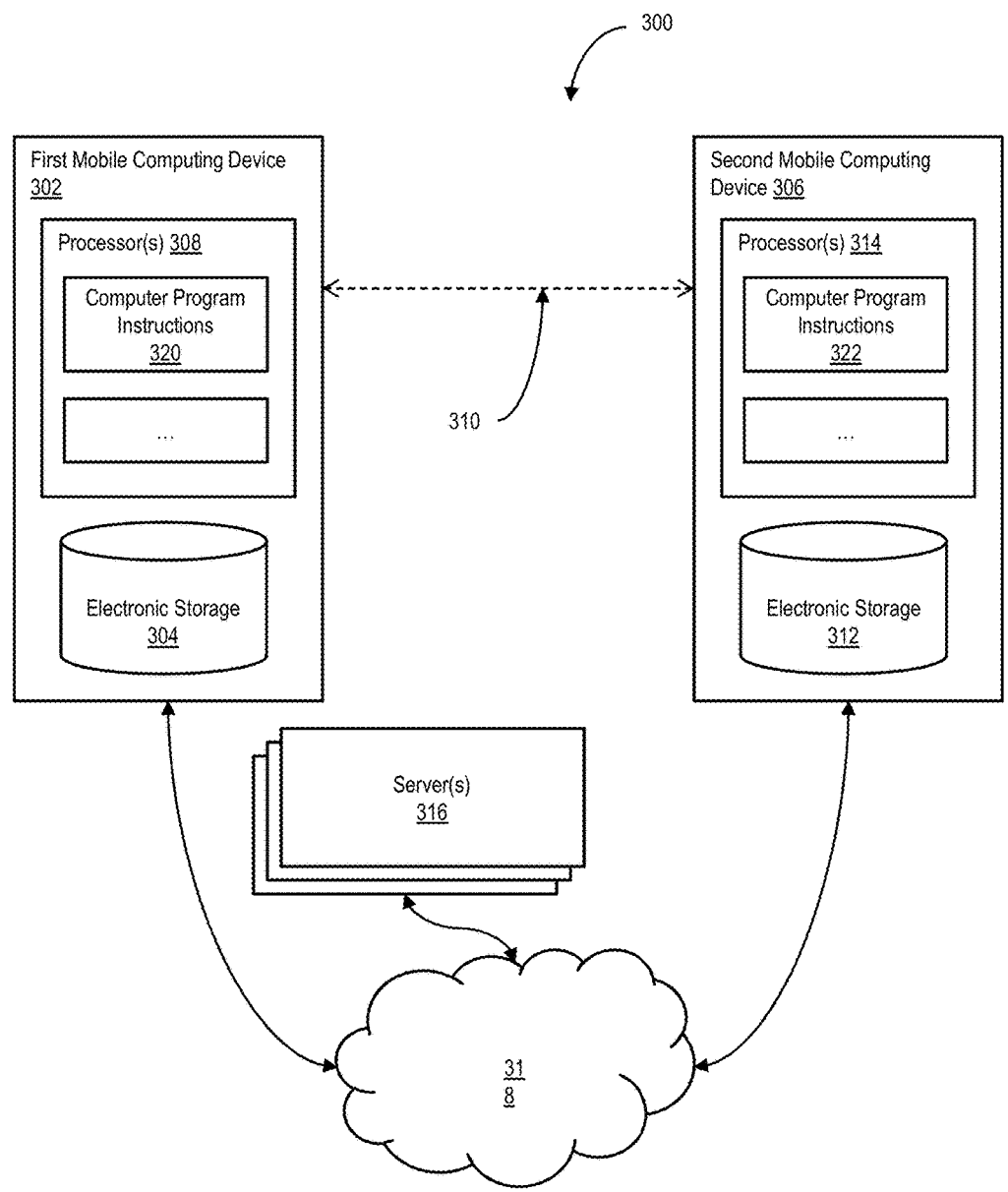
FIG. 3 is a diagram illustrating aspects of a system showing features consistent with implementations of the current subject matter.

FIG. 2 is a process flow diagram 200 illustrating aspects of a method having one or more features consistent with implementations of the current subject matter. FIG. 3 is an illustration of a system 300 having one or more features consistent with implementations of the current subject matter. Data can be stored on a first mobile computing device 302. Data can be stored on electronic storage, such as electronic storage 304 of the first mobile computing device 302. The data can be stored in a proprietary format. The user of the first mobile computing device 302 may have an intention to share the data with the user of the second mobile computing device 306. The second mobile computing device 306 may not have an application installed that is capable of reading the data in the proprietary format.

At 202 the data stored in the proprietary format on a first mobile computing device 302 can be converted into a nonproprietary format. The nonproprietary format can be a common graphics format. The conversion of the data from the proprietary format to the nonproprietary format can be facilitated by a processor 308 of the first mobile computing device 302. The conversion of the data into the nonproprietary graphical format can be performed in response to an entry and/or selection of a user on a graphical user interface associated with the application 102 associated with the proprietary format. In the variation of the current subject matter where the data is represented as a virtual business card accessed through a software application, the graphical user interface 102 of the application can include a virtual button 116. Upon an interaction, by the user, with the area of the graphical user interface 102 represented by the virtual button 116 the application can be configured to cause the first mobile computing device 302 to prompt the user to select whether to send the virtual business card in the proprietary format to another device, or whether to send it in the nonproprietary graphical format. In response to the user selection to send the data in the nonproprietary graphical format, the application may cause the first mobile computing device 302 to convert the data from the proprietary format to the nonproprietary graphical format. In the example where the data is a virtual business card, the application may cause the first mobile computing device 302 to output a file having a nonproprietary graphics format. The file containing an image of the business card (see FIG. 4).

At 204, the software application can be configured to generate a machine-readable identifier, which may be referred to herein as a label, to include with the graphics file. The label can indicate that the data included in the graphics file is associated with the software application. The label can be incorporated into the filename of the graphics file. The label inserted in the file name can facilitate searching for files associated with the software by searching by file name and not having to access the file itself. The label can be included in the metadata of the graphics file. In some variations, one or more sections of the file may be occupied by the label. In some implementations, at 202, a watermark can be added to the nonproprietary graphical format data file. The watermark can indicate the identity of the software application. The watermark can be a banner inserted between rows of contact information (see FIG. 4). The watermark can be a banner advertisement used for promotional purposes.

At 206 the data can be transferred from the first mobile computing device 302 to a second mobile computing device 306. In some variations, the data can be transferred from the first mobile computing device 302 to multiple mobile computing devices. Each of the multiple computing devices can receive and process the received data in a manner as described with reference to the second mobile computing device 306. Such a method of distributing the virtual business cards may be referred to as "pushing" the virtual business cards to recipient mobile computing devices. The virtual business card can be broadcast, by the first mobile computing device, to the other mobile computing devices. In other variations, at 206, the user of the first mobile computing device 302 can interact with the software application to cause their virtual business card to become available for download. Such a method of distributing the virtual business cards can be referred to as individual ones of the multiple mobile computing devices "requesting" the virtual business card.

The second mobile computing device 306 can include a software application configured to cause the second mobile computing device 306 to scan for available virtual business cards to download. The software application can be configured to cause the second mobile computing device 306 to present to the user of the second mobile computing device 306 an indication of available virtual business cards to download. In response to an interaction by the user with the second mobile computing device 306 indicating that the user wishes to download the virtual business card, the software application can be configured to cause the second mobile computing device 306 to download the virtual business card and store the virtual business card in the virtual business card library of the second mobile computing device 306.

Making the virtual business card available for download can provide an indication on multiple mobile computing devices that the virtual business card can be downloaded. The virtual business card can be downloaded in the proprietary format into an instance of the software application on individual ones of the multiple mobile computing devices. The virtual business card can be downloaded in the nonproprietary graphical format. In some variations, individual ones of the multiple computing devices can download the virtual business card in the proprietary and/or nonproprietary formats.

The virtual business card can be downloaded by multiple computing devices through instances of the software application. The virtual business card can be downloaded by multiple mobile computing devices through native wireless communication systems associated with the mobile computing devices. The virtual business card can be downloaded over Wide Area Networks (WANs) such as the Internet.

The mobile computing devices that can receive the broadcast, or requested, virtual business card can be selectively limited. The mobile computing devices that can receive the virtual business card can be limited based on the distance of the mobile computing device from the sending mobile computing device, in this case the first mobile computing device 302. If a recipient mobile computing device exceeds a predefined threshold distance from the first mobile computing device 302, the recipient mobile computing device can be barred from receiving the virtual business card. In this manner, the business cards received at recipient mobile computing devices are those recipients that have met, or been within a threshold distance of the sender.

The distance can be limited based on the wireless communication technology used to transmit the virtual business card from one mobile computing device to another. The wireless communication technology selected can be one that has a limited range. Any mobile computing device communicating with another mobile computing device over such a limited range wireless communication technology can be determined to be within the threshold distance. The distance can be determined based on location-based technology. For example, the mobile computing devices can determine their geographic locations using signals from satellites, base stations, beacons and other location-based signal transmitters. Based on calculations performed using those signals, the mobile computing devices can determine their geographic locations relative to a point on the Earth's surface and determine the distance between each other. Such calculations can be performed using one or more of the mobile computing devices and/or with the assistance of a server to which one or more of the mobile computing devices are in communication.

The mobile computing devices that can receive the broadcast, or requested, virtual business card can be selectively limited based on an event type. Participants that are taking part in an event can be provided access to the virtual business card. The virtual business card application can be configured to obtain information associated with the event and verify participation in the event by the intended recipients of the virtual business card. The virtual business card application can be configured to determine whether a potential recipient of the virtual business card is associated with the same event as the owner of the virtual business card. The virtual business card application can be configured to cause the processor(s) of the mobile computing device on which it is being executed to access calendar information, telephone usage information (e.g. telephone numbers associated with a telephone call), webinar access, geographic location and/or other information associated with the mobile computing device and/or the user of the mobile computing device. Based on the obtained information, the virtual business card application can be configured to cause the processor(s) to determine whether the proposed recipient of the virtual business card is participating in the same event as the sender. Such events may be a meeting, a conference call, webinar, a gathering of people at a venue, and/or other events.

The data can be transferred using wireless communication technology. The data can be transferred from the first mobile computing device 302 to the second mobile computing device 306 using a direct wireless communication connection 310. The wireless communication connection 310 can use any wireless communication connection between the first mobile computing device 302 and the second mobile computing device 306. The following is a non-exhaustive list of wireless communication technologies and standards contemplated by the current subject matter: ANT+, Bluetooth, Cellular, IEEE 802.14.5, IEEE 802.22, ISA100a, Infrared (IrDA), ISM band, Near-Field-Communication (NFC), Radio-frequency identification (RFID), 6LoWPAN, Ultra-Wide Band (UWB), Wi-Fi, Wi-Fi Direct, Wireless HART, WirlessHD, WirelessUSB, ZigBee, Z-Wave, and/or other wireless technologies and standards.

In some implementations third-party software applications can facilitate the transfer of the data from the first mobile computing device 302 to the second mobile computing device 306. Airdrop on the Apple® iPhone® and iPad® is one such example. Beam and CoPresence on Google Android-based devices is another such example. These examples are illustrative only and not intended to be limiting. The software application can be configured to integrate with the first mobile computing device 302 and transfer the data, or graphics file, using native wireless and/or software data transfer technology. The second mobile computing device 306 may prompt the user of the second mobile computing device 306 to accept the sending of the data. Native software on the second mobile computing device 306 may facilitate receipt of the data in the nonproprietary graphics format.

At 206, the second mobile computing device 306 can store the data having the nonproprietary graphical format in electronic storage 312. The second mobile computing device 306 can store the data having the nonproprietary graphical format in electronic storage 312 in a directory associated with graphical format files. For example, a photo album stored on the second mobile computing device 306. A user of the second mobile computing device 306 can access the data stored in the nonproprietary graphical format by accessing it from electronic storage 312 on the second mobile computing device 306.

Figure 4:
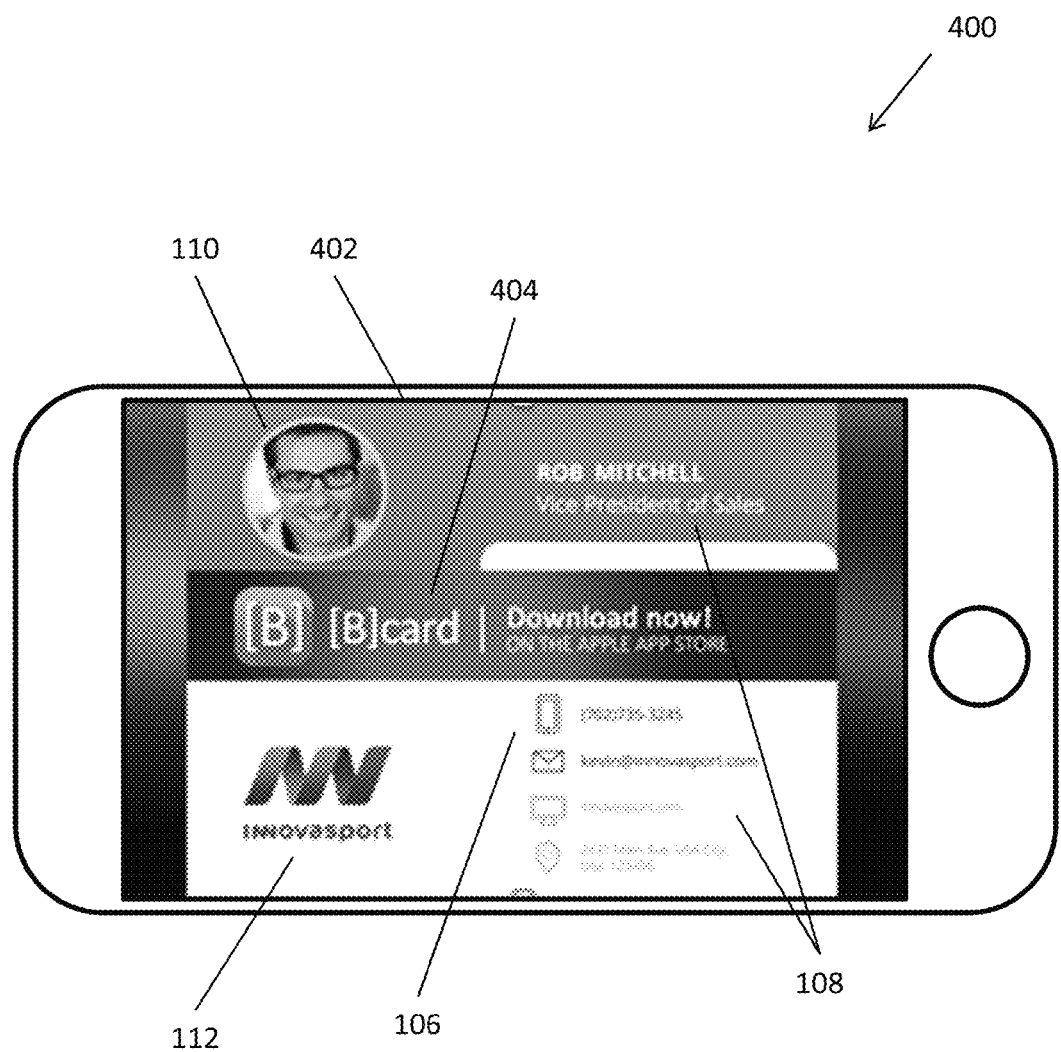
FIG. 4 is a diagram illustrating aspects of data stored in a graphical nonproprietary format having features consistent with implementations of the current subject matter; and, FIG. 5 is a diagram illustrating aspects of data stored in a proprietary format having features consistent with implementations of the current subject matter.

FIG. 4 is an illustration 400 of the data in the nonproprietary graphical format having one or more features consistent with the current subject matter. The data represented in FIG. 4 includes contact information. The contact information can be presented in the form of a virtual business card 402. The virtual business card illustrated in the graphic format file can have similar information to the virtual business card presented through the software application, as shown in FIG. 1. The contact information presented in the nonproprietary graphical format can include a watermark 404. The watermark 404 can be in the form of a banner. The watermark 404 can provide an identity of the application associated with the proprietary format. In the example used herein, the watermark 404 can provide an indication of the virtual business card application.

The processor 308 of the first mobile computing device 302 can be configured to insert the watermark 404 when converting the virtual business card from the proprietary format to the nonproprietary graphical format. The contact information can be stored in fields in the proprietary format. Converting data in the proprietary format into the nonproprietary graphical format can include generating a nonproprietary graphics file that includes an image of the contact information. The image in the nonproprietary graphics file can be arranged such that the information is not obscured by the watermark 404.

The watermark 404 can prompt the user to download the software application associated with the proprietary format. In response to downloading the software application associated with the proprietary format, at 208, the software application can cause one or more processors 314 of the second mobile computing device 306, to identify data in the nonproprietary graphical format stored in the electronic storage 312 of the second mobile computing device 306. In the present example, the software application can be configured to cause the processor(s) 314 to identify in the native graphics directory of the second mobile computing device 306 images of virtual business cards by searching for file names that include a label associated with the software application. In some variations, the processor(s) 314 can be configured to search for metadata, embedded information, and/or other indications that the image is associated with the software application.

The image file can be identified as being associated with the software application based on the watermark 404 contained in the image. The image file can be identified as being associated with the software application based on a label of the image file stored in the nonproprietary graphical format. The label can be included as metadata embedded within the data.

At 210, in response to identifying at least one image file in the electronic storage 312 of the second mobile computing device 306 that is associated with the software application, the software application can cause the one or more processors 314 of the second mobile computing device 306 to convert the image of the virtual business card in the nonproprietary graphical format into the proprietary format of the software application. In effect, at 210, the data is converted back into its original form, but now on the second mobile computing device 306.

The virtual business cards can be stored on the first mobile computing device 302 and the second mobile computing device 306 in a virtual business card library. The virtual business card library can be associated with the software application. The virtual business card library can be a file system separate from the software application that is accessed by the software application. Each of the virtual business cards are associated with a contact. An instance of a contact's virtual business card can be stored in the virtual business card libraries of multiple users of the application. Those users being recipients of the virtual business card from the individual.

In some implementations, the first mobile computing device 302 and the second mobile computing device 306 can communicate with one or more servers 316. The first mobile computing device 302 and the second mobile computing device 306 can be connected to the one or more servers 316 through a network 318. Information that is necessary for the software application to generate a presentation of the virtual business card to the user, in the proprietary format, can be stored on the one or more servers 316. At 208, the label associated with the graphics file in the nonproprietary format stored in the native image directory of the second mobile computing device 306 can include an indication of the individual contact that is associated with the virtual business card represented in the image file. The software application can cause the one or more processors 314 of the second mobile computing device 306 to request, from the server(s) 316, the information necessary to generate the virtual business card in the software application for that individual contact associated with the first mobile computing device 302. The server(s) 316 can transmit that information and facilitate the software application operating on the second mobile computing device 306 to add the individual contact's virtual business card associated with the first mobile computing device 302 to the virtual business card library on the second mobile computing device 306.

The data stored in the second mobile computing device 306 and the data stored in the first mobile computing device 302 can be maintained in a consistent manner. For example, a user of the first mobile computing device 302 can update their contact information and thereby change their virtual business card. If they change jobs, the user can update their job title, the company they work for, their email address, their telephone number and/or other information. In response to updating the contact information, the software application can cause the first mobile computing device 302 to send the updated contact information to the one or more servers 316. The server(s) 316 can include the contact information of the user and can update the contact information of the user. In some variations, the server(s) 316 can act as a relay, merely relaying the updated information to those users that have an instance of the updating user's virtual business card in their virtual business card library. In response to an indication that one user's virtual business card has been updated, each mobile computing device running the software application that has that user's virtual business card stored in its virtual business card library can receive the updated information. In response to receipt of the updated information the instance of the updating user's virtual business card in each user's virtual business card library can be updated. In this manner, contact information associated with an individual can be automatically updated for each of their contacts in response to the contact updating their information.

In some variations, the information associated with a contact can include a time stamp. The contact information on the second computing device 306 can be updated in response to determining that the information provided by the one or more servers 316 to the second mobile computing device 306 is more recent than the contact information stored on the second mobile computing device 306. In response to an indication that the contact information stored on the second mobile computing device 306 is more recent than the contact information provided by the server, the second mobile computing device 306 can refrain from updating the contact information. In some variations, the second computing device 306 can be configured to transmit the updated contact information to the server(s) 316.

The software application can limit the manner in which users of the software application can share their contact information. Networking websites, such as LinkedIn, allow users to send a connection request to anyone on the LinkedIn network, regardless of where that individual is or what they do. The currently described subject matter can limit sharing of contact information to only those persons who are within range of the short-range wireless communication technology of the mobile computing devices involved. In this manner, users having the software application on their mobile computing devices can be assured that they have physically met the contact.

In some variations, the software application can be configured to update a native contact directory stored on the first mobile computing device 302 or the second mobile computing device 306. In response to receiving new or updated contact information at the software application, the software application can be configured to cause the native contact directly of the first mobile computing device 302 and/or the second mobile computing device 306 to be updated. The native contact directory can include individual contact entries. In response to receipt of new contact information, the native contact directory can be augmented with a new individual contact entry associated with the new contact information. In response to receive of updated contact information, individual contact entries in the native contact directory can be updated to include the updated contact information.

In response to an indication that the user of the second mobile computing device 306 has downloaded the software application and converted the virtual business card of the user of the first mobile computing device 302, the virtual business card of the user of the second mobile computing device 306 can be automatically transmitted to the first mobile computing device 302. Transmission of the contact information can be directly through a direct wireless connection 310, or transmission of the contact information can be performed by, or through, a server 316. In this manner, virtual business cards or contact information can be automatically exchanged.

The mobile computer device can include a camera. The processor(s) 308 of the first mobile computing device 302 can be configured to cause the camera to capture an image of a physical business card. The image of the physical business card can be stored in the virtual business card library associated with the virtual business card application. Personal contact information associated with the subject of the business card can be obtained. The personal contact information can include an email address, telephone number, social media tag, and/or other personal contact information. The personal contact information can be obtained by the processor(s) 308 being configured to cause the first mobile computing device 302 to prompt the user to enter in personal contact information associated with the subject of the business card. The personal contact information can be obtained by the processor(s) 308 parsing the text on the business card to identify personal contact information printed on the business card. The processor(s) 308 can be configured to convert the personal contact information appearing in the captured image of the business card and convert it to machine-readable text. Other text can be obtained from the image of the physical business card in a similar manner. The personal contact information obtained from the image of the physical business card and/or input by a user can be associated with the image of the physical business card stored in the virtual business card library of the virtual business card application.

The processor(s) 308 can be configured to populate a virtual business card with the information obtained from the image of the physical business card. The processor(s) 308 can be configured to parse the image of the physical business card and identify text contained on the physical business card. The processor(s) 308 can be configured to identify various contact information elements, such as name, title, telephone number, email address, fax number, company name, address, and/or other contact information elements. The processor(s) 308 can be configured to generate a virtual business card based on this obtained contact information.

The processor(s) 308 can be configured to generate an electronic message to the individual associated with the contact information. The electronic message can be sent via email, SMS, MMS, and/or other electronic messaging technology. The electronic message can include a promotion of the software application for managing the contact information and distribution of the contact information. The electronic message can prompt the recipient to download the software application. Once downloaded, the software application can cause the population of virtual business cards based on the images of the physical business cards.

The user of the second mobile computing device 306 can download the virtual business card application. The virtual business card application can be configured to cause the processor(s) 314 of the second mobile computing device 306 to facilitate configuration of a virtual business card for the user of the second mobile computing device 306. The virtual business card application can be configured to cause the second mobile computing device 306 to transmit data associated with the configured virtual business card of the user of the second mobile computing device 306 to a server(s) 316. In response to the server(s) 316 receiving the data associated with the virtual business card of the user of the second mobile computing device 306, and an indication that the first mobile computing device 302 has an image of the physical business card of that user, the server(s) 316 can transmit the data associated with the virtual business card of the user of the second mobile computing device 306 to the first mobile computing device 302. The virtual business card application can be configured to cause the processor(s) of the first mobile computing device 302 to replace the image of the physical business card in the virtual business card library of the first mobile computing device 302.

Figure 5:
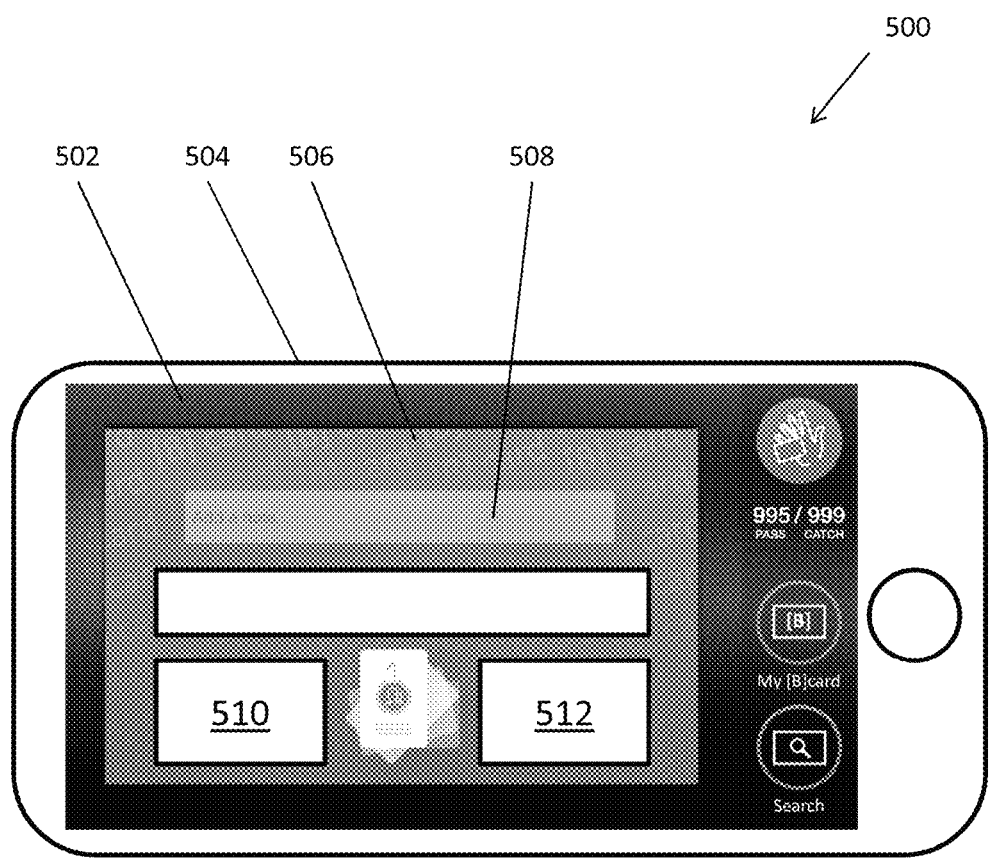

FIG. 5 is an illustration 500 of a presentation of the contact information in the proprietary format having one or more elements consistent with the current subject matter. The virtual business card software application can be configured to facilitate an interaction with the graphical user interface 502 on the mobile computing device 504 by the user of the mobile computing device 504. The user can select the back-view 506 of the virtual business card by swiping sideways across the front of the virtual business card. The user can select the back-view 506 of the virtual business card by interacting with a virtual button or real button.

The back view 506 of the virtual business card can include a notes section 508. The notes section 508 can be configured to receive text entered by the user. The notes section 508 can provide similar functionality to writing information on the back of a business card. The processor(s) of the mobile computing device 504 can be configured to update the native contact information on the mobile computing device with the information input by the user, into the notes section 508.

The back view 506 of the virtual business card can include one or more multimedia sections 510, 512. The one or more multimedia sections 510, 512 can include media selected by the contact associated with the virtual business card. The one or more multimedia section 510, 512 can include media selected by the employer of the contact associated with the virtual business card. In some variations, a first multimedia section 510 can include media selected by the contact, and the second multimedia section 512 can include media selected by the employer of the contact. The media can be updated periodically. When updated by the employer, the media shown in the multimedia section(s) can be pushed automatically to all users of the software application that have the contacts virtual business card. The media shown in the multimedia section(s) 510, 512 can include print media, video, links, promotional media, notifications, offers, and other forms of multimedia. In some variations, multimedia content can be pushed, or published, to a subset of instances of the business cards of the contacts. The software application can be configured to cause the mobile computing device 504 to provide a notification when the multimedia content has been updated. The media displayed in the multimedia sections 510, 512 can be provided from one or more servers connected to mobile computing device. The multimedia sections 510, 512 can be virtual spaces that provide portals to one or more external sources of multimedia content.

The back view 506 can include one or more virtual spaces. The one or more virtual spaces can include the one or more multimedia sections 510, 512. The one or more virtual spaces can include one or more interactive buttons. The one or more interactive buttons can be activated by a user interacting with the portion of the graphical user interface occupied by the one or more interactive buttons. In response to an interaction with the graphical user interface occupied by an interactive button, the processor(s) of the mobile computing device can be configured to cause external information to be presented. The external information can be presented to the user through the display provided by the software application. The external information can be presented to the user with the aid of an external application, such as a web browser application. Interaction with the graphical user interface occupied by an interactive button can cause the processor(s) to execute a web browser and present online content to the user. In some implementations a virtual game can be activated.

The software application can integrate with the native and/or third-party calendar or organization applications on the mobile computing device. Similarly, the software application can integrate with geo-location technology of the mobile computing device. At 202, during conversion, by the transmitting mobile computing device, of the virtual business card from the proprietary format to the nonproprietary graphical format, the software application can be configured to cause the one or more processor(s) to access information associated with the calendar applications of the mobile computing device. Similarly, the software application can be configured to cause the one or more processor(s) to access information associated with the geo-location technology of the mobile computing device. Calendar information, such as the name of an event at which the user of the mobile computing device is currently attending can be included in the virtual business card sent in the nonproprietary graphical file format. Geo-location information can also be included.

At 210, during conversion, by the recipient mobile computing device, the calendar information and/or location information can be imported with the other information associated with the virtual business card. Consequently, the identity of the event and/or location at which the recipient met the transferor of the virtual business card can be stored in the virtual business card library and maintained. Such information can be transmitted to the transferor of the virtual business card in response to the recipient registering with the virtual business card software.

The software application can prohibit the transmission of virtual business cards by those users who have had no direct contact with the intended recipient. A transmitting user can transmit their virtual business card to multiple recipients simultaneously. The transmission can be performed over a direct connection between the transmitting and the receiving computing devices. The transmission can be performed over an indirect connection between the transmitting and the receiving computing devices, such as over the Internet. Certain direct connection technologies require devices to be physically close to each other in order for the signals to be strong enough to facilitate transmission of data. Consequently, the software application can identify that the method of transmission is through such a direct connection and permit the transmission to occur. Alternatively, the software application can integrate with one or more native elements of the mobile computing device to determine the location of the transmitting mobile computing device relative to the recipient mobile computing device. In response to an indication that the transmitting mobile computing device is outside of a threshold distance from the intended recipient mobile computing device, the software application can be configured to deny transmission of the virtual business card.

The software application can be configured to facilitate transmission of a virtual business card to a recipient in response to identifying that the transmitting mobile computing device is in close proximity to a physical business card of the intended recipient. The software application can be configured to use a camera associated with the mobile computing device to take an image of the physical business card. The software application can be configured to parse the image of the business card to identify information on the business card. In response to identifying that the physical business card is associated with the intended recipient, the software application can be configured to cause transmission of the virtual business card to the intended recipient.

In some variations, a virtual marketplace can be provided for business card designers. The virtual marketplace can provide designers a platform to design elements of the virtual business card, such as the business cards, company logos, multimedia elements, marketing tag lines, and/or other elements of the virtual business cards. The virtual marketplace can facilitate the management of logo design competitions. The virtual marketplace can be hosted for designers, businesses, and users. The host of the marketplace can charge brokerage fees and/or management fees for hosting the virtual marketplace.

The software application can facilitate the purchase of customizable virtual business cards or virtual business card templates. Such customizable virtual business cards and/or virtual business card templates can provide features otherwise unavailable to the user of the software application. In response to an employer or user obtaining such a customizable virtual business or virtual business card template, the appearance of each employees virtual business card, or the appearance of the user's card can be updated to reflect the new virtual business card. Users having the employees' business cards stored in their local virtual business card library will have that contact's business card updated with the new appearance.

Enterprise features can be provided. The software application can provide a verification that a contact is properly associated with an enterprise. Referring to FIG. 1, the software application can be configured to include a watermark 114 on the virtual business card that indicates that the enterprise logo 112 and/or other identifying elements of the enterprise are properly associated with the contact. The watermark 114 can be included in an area of the virtual business card that can not otherwise be amended by the user. The watermark 114 can include an emblem, logo, signet and/or other mark.

The software application can facilitate self-management by enterprises of the business card creation process. Employees of the enterprise can register with the software application. The employees can be prompted to enter an employer's identity. In response to the employee selecting the employer's identity, the employee can be presented with the employer's virtual business card template. The employee can then fill in their contact information on the card. The title of the employee can be verified by modules managed by the enterprise. The title can be generated by the software based on input from the enterprise. The company email address of the employee can be generated in a similar manner. Other information, such as the company logo, can be automatically generated as part of the template.

Providing a virtual business card self-management system, companies can save time, improve accuracy, reduce expenses, and facilitate the distribution of updated contact information of employees. In the case where an employee is already registered with the virtual business card management software application, the employee select their new employer. A verification can be performed to ensure that the employee is an employee of the new employer. In response to selection of the employer, the employee's virtual business card can be updated with employer-specific information. For example, the logo of the employee's virtual business card can be substituted with the employer's logo. The employee's office telephone number, email address and other employer-specific contact information can be updated. The employee's title can be updated. One or more multimedia elements on the back-view of the virtual business card can be updated. Contact information that is specific to the employee can remain in place, such as the employee's name, personal telephone numbers, personal email addresses and other contact information personal to the employee. The template adopted by the enterprise can control the type of personal information an employee may associate with their virtual business card that is also associated with the employer. For example, an employer may restrict display of social media accounts, personal email addresses and other such contact information associated with the employee.

The enterprise can control various elements of the virtual business card associated with an employee or contact. For example, the enterprise can push new logos to be associated with their employee's virtual business cards. All users that have one of their employee's virtual business cards in their business card library will see the new logo on those contacts virtual business cards. Similarly, if an employee leaves a company, the logo, company-specific contact information, company-specific multimedia content, and/or other company-specific content of the virtual business card can be stripped. All users that have that employee's virtual business card will similarly have all company-specific content removed from that contact's virtual business card in their business card libraries. When that contact is hired by a new company, the new company's company-specific content can repopulate those area's of the contacts virtual business card and it will appear in all users' business card libraries. During any such transitionary period prior to new company information being available, any previously removed content can be automatically replaced with relevant default design or card template elements as provided by the application and/or empty fields prompting user by notification to update such fields.

The software application can be configured to permit an enterprise to manage company-specific elements of the virtual business cards of its employees. For example, the enterprise can manage, control, and/or edit business card elements that it may determine belongs to it for marketing purposes or otherwise, such as its company name, logo, or other elements associated with what it determines to be its brand. An employee of that business could separately edit, control, and/or manage his or her name, picture, contact information, social media links, or other published content that may or may not involve the approval of its employer. The software application can be configured to provide the tools, hosted service, and other required functionality to ensure that both parties could achieve their desired objectives, while ensuring the integrity and security of the virtual business card.

The current subject matter also contemplates the transfer of data between mobile computing devices using the native graphical file storage system of the mobile computing devices. The data can be any type of data such as document files, machine-compilable code, machine-executable code, graphical files and/or other file types. A file can be converted from a proprietary format to a nonproprietary standard graphical format. Information within the file can be included in one or more layers of the graphical file format. The information can be encrypted prior to or during, conversion from the proprietary format to the nonproprietary format. In some implementations, the data representing the proprietary format file can be embedded in one or more layers of the nonproprietary graphical file. In this manner, a seemingly standard graphics file can be transferred from a first mobile computing device to a second mobile computing device, or multiple mobile computing device, containing the hidden information. In some implementations, an image can be created to be included in the nonproprietary graphics file where the image contains in its pixels the information contained in the proprietary data file. The software application on one or more recipient mobile computing devices can be configured to extract that information and recompile the proprietary data file.

The transfer of data in this manner can facilitate the secure transfer of information in a proprietary and/or encrypted format without the recipient mobile computing device having the necessary software installed to convert the transferred information into data that is readable by a human. The software can be installed on the recipient mobile computing device after receipt of the information so that the data can be reconverted back to its original form. The recipient mobile computing device can be used as a carrier of the data, later transferring the data to a device that is capable of converting it back to its original form.

With reference to FIG. 3, the first mobile computing device 302 may include electronic storage 304 and the second mobile computing device 306 may include electronic storage 312. The first mobile computing device 302, the second mobile computing device 306, and the server(s) 316 may include communication lines, or ports to enable the exchange of information with a network and/or other computing platforms. Illustration of the first mobile computing device 302, the second mobile computing device 306 and the server(s) 316 is not intended to be limiting. The first mobile computing device 302, the second mobile computing device 306 and/or the server(s) 316 may include a plurality of hardware, software, and/or firmware components operating together to provide the functionality attributed herein any one of the first mobile computing device 302, the second mobile computing device 306 and/or the server(s) 316.

The first mobile computing device 302, the second mobile computing device 306 and/or the server(s) 316 may include one or more processors configured to execute computer program instructions 320 and 322. The computer program instructions may be configured to enable a user associated with the first mobile computing device 302, the second mobile computing device 306 and/or the server(s) 316 to interface with system 300 and/or provide other functionality attributed herein to the first mobile computing device 302, the second mobile computing device 306 and/or the server(s) 316. By way of non-limiting example, the first mobile computing device 302 and/or the second mobile computing device 306 may include one or more of a desktop computer, a laptop computer, a handheld computer, a tablet computing platform, a NetBook, a Smartphone, a gaming console, a smartwatch, wearable computing devices and/or other computing platforms.

Electronic storage 304 and 312 may comprise electronic storage media that electronically stores information. The electronic storage media of electronic storage 304 and 312 may include one or both of system storage that is provided integrally (i.e., substantially non-removable) with the first mobile computing device 302 and/or the second mobile computing device 306 and/or removable storage that is removably connectable to the first mobile computing device 302 and/or the second mobile computing device 306 via, for example, a port (e.g., a USB port, a firewire port, removable SD card port, etc.) or a drive (e.g., a disk drive, etc.). Electronic storage 304 and 312 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 304 and 312 may include one or more virtual storage resources (e.g., cloud storage, a virtual private network, and/or other virtual storage resources). Electronic storage 304 and 312 may store software algorithms, information determined by processor(s) 308 and 314, information received from the first mobile computing device 302, the second mobile computing device 306 and/or the server(s) 316, and/or other information that enables the first mobile computing device 302, the second mobile computing device 306 and/or the server(s) 316 to function as described herein. The electronic storage 304 and 312 described herein can be disposed remotely, such as in server(s) 316 or on external devices in electronic communication with the first mobile computing device 302, the second mobile computing device 306 and/or the server(s) 316.

Processor(s) 308 and 314 are configured to provide information processing capabilities in the first mobile computing device 302 and the second mobile computing device 306. As such, processor(s) 308 and 314 may include one or more of a digital processor, an analog processor, a digital circuit designed to process information, an analog circuit designed to process information, a state machine, and/or other mechanisms for electronically processing information. Although processor(s) 308 and 314 are shown in FIG. 3 as single entities, this is for illustrative purposes only. In some implementations, processor(s) 308 and 314 may each include a plurality of processing units. These processing units may be physically located within the same device, or processor(s) 308 and 314 may represent processing functionality of a plurality of devices operating in coordination. The processor(s) 308 and 314 may be configured to execute computer program instructions 320 and 322. The computer program instructions 320 and 322 may cause the processor(s) 308 and 314 to perform one or more of the operations and/or features described herein. Processor(s) 308 and 314 can be configured to execute one more additional and/or alternative operations than those described herein. Processor(s) 308 an 314 can be configured to perform its functions by software; hardware; firmware; some combination of software, hardware, and/or firmware; and/or other mechanisms for configuring processing capabilities on processor(s) 308 and 314.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer program applications, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    converting, by at least one physical computer processor on a first mobile computing device, contact information stored in a proprietary data format on the first mobile computing device to a nonproprietary graphical format that includes one or more machine-readable identifiers;
    determining, by the at least one physical processor on the first mobile computing device, whether a first user of the first mobile computing device is participating in an event;

determining, by the at least one physical processor on the first mobile computing device, whether a second user of a second mobile computing device is participating in the event; and transferring, based on the determining that the first user and the second user are participating in the event and by using a data transfer system of the first mobile computing device and a data transfer system of the second mobile computing device, the contact information in the nonproprietary graphical format from the first mobile computing device to the second mobile computing device.

2. The method as in claim 1, further comprising:

identifying, based on the one or more machine-readable identifiers of the non-proprietary graphical format, contact information stored on the second mobile computing device in the nonproprietary graphical format;

converting, by at least one physical processor on the second mobile computing device, the contact information in the nonproprietary graphical format to the proprietary format; and, storing, by the at least one physical processor on the second mobile computing device, the contact information in the proprietary format on the second mobile computing device.

3. The method as in claim 2, further comprising:

facilitating, by the at least one processor of the second mobile computing device, execution of a contact information management application;

receiving, by the at least one processor of the second mobile computing device, contact information associated with the user of the second mobile computing device; and, transmitting, by the second mobile computing device, the contact information associated with the user of the second mobile computing device to the first mobile computing device.

4. The method as in claim 1, wherein the contact information stored in the nonproprietary graphical format facilitates presentation of the contact information on a display of the second mobile computing device.

5. The method as in claim 1, wherein the one or more machine-readable identifiers associates the contact information stored in the nonproprietary graphical format as being associated with a mobile application that uses the proprietary format.

6. The method as in claim 5, wherein further comprising:

identifying, based on the one or more machine-readable identifiers of the non-proprietary graphical format, contact information stored in the nonproprietary graphical format that is associated with the mobile application.

7. The method as in claim 5, wherein the one or more machine-readable identifiers includes a watermark embedded in the contact information stored in the nonproprietary graphical format.

8. The method as in claim 1, further comprising:

receiving, at a server, updated contact information for the contact information stored in the proprietary format on the first mobile computing device;

transmitting the updated contact information to the second mobile device; and, updating the contact information stored in the proprietary format on the second mobile device with the updated contact information.

9. The method as in claim 1, wherein the transferring of the contact information in the nonproprietary graphical format from the first mobile computing device to a second mobile computing device is performed using a short-range wireless communication technology between the first mobile computing device and the second mobile computing device.

10. The method as in claim 1, wherein participation in the event is determined based on the proximity of the first mobile computing device to the second mobile computing device.

11. The method as in claim 1, wherein participation in the event is determined based on information obtained by the first mobile computing device and the second mobile computing device from one or more of an electronic calendar, a telephone history, and electronic messages.

12. The method as in claim 1, further comprising:

transmitting, by the first mobile computing device, an indication, to the second mobile computing device, that the contact information stored in the proprietary format on the first mobile computing device can be downloaded to the second mobile computing device; and, receiving, at the first mobile computing device and from the second mobile computing device, a request to download the contact information stored in the proprietary format on the first mobile computing device.

13. The method as in claim 1, wherein, subsequent to the transferring of the contact information, the contact information is stored on the second mobile computing device in the nonproprietary graphical format, the nonproprietary graphical format including the one or more machine-readable identifiers.

* * * * *